Dec. 11, 1928.
W. W. DRYDEN
FOOD GRINDER
Filed Aug. 30, 1924
1,694,502
2 Sheets-Sheet 1
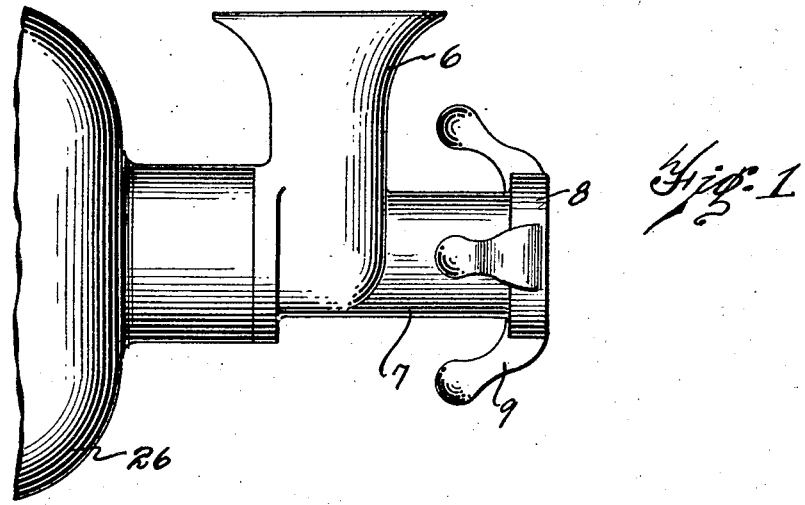
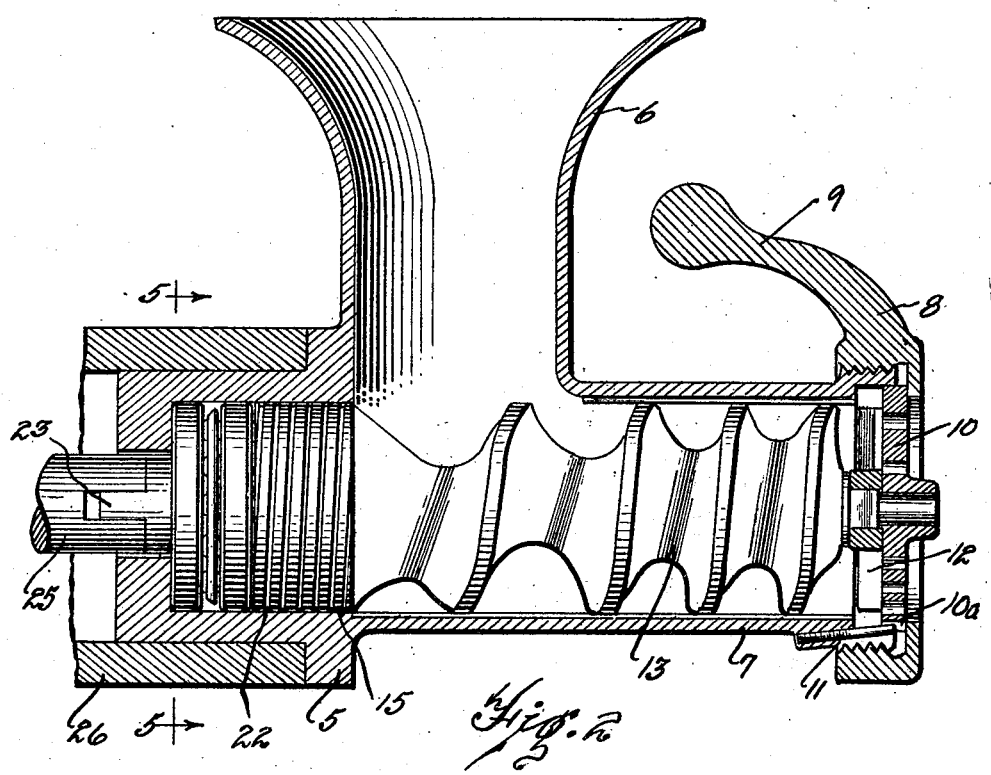
INVENTOR.
William W. Dryden
BY
Rex Frye
ATTORNEY.

Dec. 11, 1928. 1,694,502
W. W. DRYDEN
FOOD GRINDER
Filed Aug. 30, 1924 2 Sheets-Sheet 2
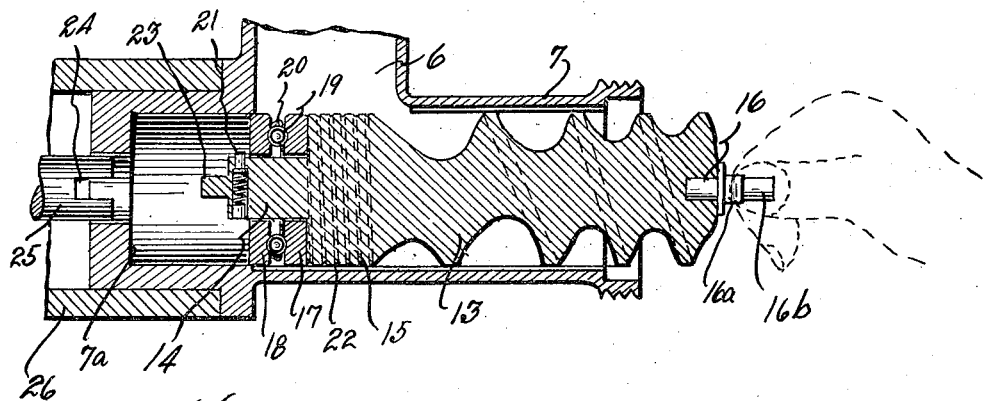
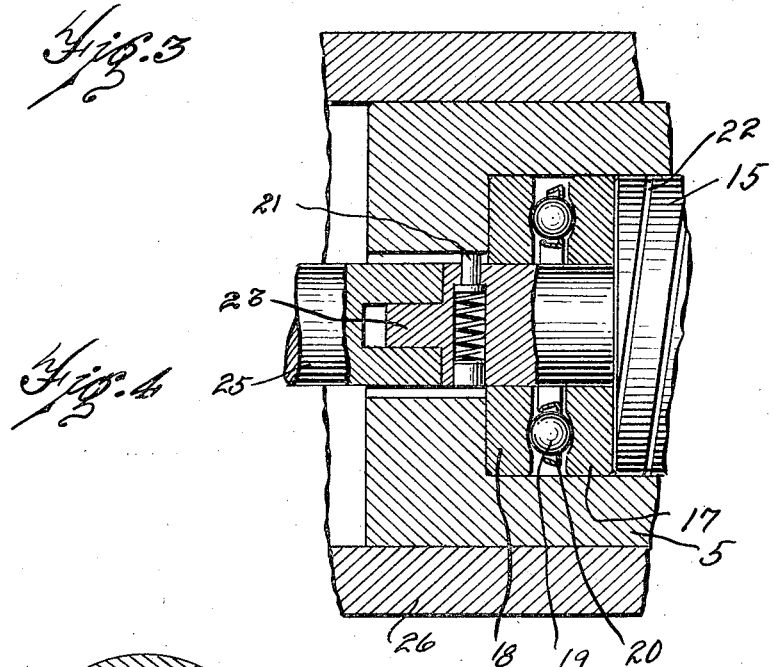
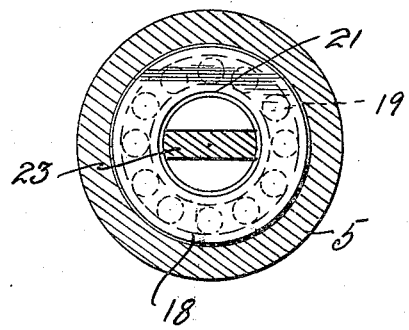
INVENTOR.
William W. Dryden
BY
Rex Frye.
ATTORNEY.

Patented Dec. 11, 1928.

1,694,502

UNITED STATES PATENT OFFICE.

WILLIAM W. DRYDEN, OF LOUISVILLE, KENTUCKY, ASSIGNOR TO WALTER F. STIMPSON, OF LOUISVILLE, KENTUCKY.

FOOD GRINDER.

Application filed August 30, 1924. Serial No. 735,073.

This invention relates to machines for grinding meats, vegetables, nuts and the like.

It has long been a desideratum among manufacturers and users of food grinders to adjust cutter members to vary the fineness of the ground product without materially affecting the frictional resistance offered by the mechanism, and at the same time to fit the rotatable and fixed members adjacent the inlet end so snugly that juices and ground particles cannot issue from other than the outlet end of the machine. My invention has for its primary object the provision of a machine that will accomplish this.

Another object of the invention is the mounting of a thrust bearing on the rotatable member whereby one race portion will effectively seal the inlet end of the machine against the escape of juices, etc., therethrough while the remaining portions of the bearing will take up the differences in pressure due to adjustment of the cutter members.

A further object of the invention is the arrangement of all parts other than the casing on a single shaft which can be readily removed from the casing for cleansing.

Other objects and advantages will be apparent from the following description wherein reference is made to the accompanying drawings illustrating a preferred embodiment of my invention, and wherein similar reference numerals designate similar parts throughout the several views.

In the drawings:—

Fig. 1 is a side elevation of a food grinder constructed in accordance with my invention positioned upon a power transmitting member, the adjacent portion only of which is shown.

Fig. 2 is a central vertical section through the grinder.

Fig. 3 is a detail sectional view showing the manner of removing the main shaft and its associated parts.

Fig. 4 is an enlarged detail view showing the thrust bearing and adjacent mechanism, and Fig. 5 is a cross section taken substantially on the line 5—5 of Fig. 2.

Referring now to the drawings, the numeral 5 designates a casing having an inlet throat 6 and a horizontal barrel 7 open at one extremity for the issuance of the products ground in the machine. The open extremity of the barrel 7 is exteriorly threaded for the reception of an adjusting member 8, which is preferably formed with a plurality of radial arms 9 which can be conveniently grasped when adjustment of the cutter members of the machine is desired. The adjusting member 8 is formed with a central apertured portion having a wall adapted to engage the outer portion of a cutter member 10, which is slideably mounted within the open end of the casing and is held from rotation by means of a key 11 threaded through the casing and extending into a notch 10ᵃ in the cutter member. Preferably the cutter member 10 is formed with a plurality of radially spaced apertures through which the ground products issue, and against the forward edge of which the food is adapted to be cut by the rotatable cutter member 12 mounted upon the feed shaft 13. The cutter member 12 is preferably formed with a plurality of radial blades and a hub portion having a polygonal aperture adapted to fit over a similarly shaped portion on the reduced extremity of the feed shaft 13.

The feed shaft 13 as herein shown comprises a casting having a rounded reduced portion 14 on the extremity opposite to the outlet end of the machine, a wide portion 15 having an accurately machined forward wall, and a worm feed portion arranged to deliver food products placed in the inlet throat 6 to the cutter members 10 and 12. As best shown in Fig. 3 a hardened steel stub shaft 16 is centrally mounted in the outlet end of the feed shaft and has a polygonal portion 16ᵃ for interfitting with the apertured hub of the cutter member 12 and a rounded extremity 16ᵇ for use as a journal bearing in the hub portion of the cutter member 10.

The inlet throat 6 opens into the barrel 7 at a distance from the forward end of the barrel (note Figs. 2 and 3) and this forward portion of the barrel is utilized for the mounting of a thrust bearing to permit the various adjustments of the cutter members without materially affecting the frictional resistance offered by the feed shaft. The thrust bearing is herein shown as comprising a rear race member 17 having its rear wall machined to snugly engage the forward wall of the wide portion 15 of the feed shaft; a forward race portion 18 having its forward wall machined to snugly fit against the rear surface of the forward wall 7ᵃ of the casing, and a circumferential series of ball bearings 19 suitably spaced in a retaining ring 20. The race members 17 and 18 with the ball bearing member between them are slipped over the reduced portion 14 of the feed shaft, substantially as shown in Fig. 3. A spring pressed retaining pin 21 is arranged to project from the shaft portion 14 forwardly of the race member 18 to prevent the accidental dislocation of the bearing members while permitting slight movement of the bearing members longitudinally of the shaft.

The wide portion 15 of the feed shaft is provided on its periphery with a shallow groove 22 spirally wound to lead all juices and food particles that may reach the portion of the casing forwardly of the inlet throat back to the main worm portion of the feed shaft. This spiral groove 22 acts as a secondary worm feed to deliver food to the cutter members, and guards the bearing members from contact with the juices, etc., which may injuriously affect their life. However, the bearing members may be readily removed with the feed shaft 13 for cleansing, and it is intended that the bearing members be thoroughly scoured each time the feed shaft and cutter members are cleansed.

The forward extremity of the feed shaft 13 is preferably formed with a tongue 23 adapted to extend through an aperture in the forward wall 7ᵃ of the barrel and engage in a slot 24 in the adjacent end of a power shaft 25. In use, I preferably provide a motor suitably mounted in a casing 26 having a sleeve adapted to fit over the forward end of the barrel 7, the shaft 25 being suitably driven by the motor at any desired speed. When the motor rotates the feed shaft 13 is rotated to force the food products from the inlet throat 6 to the cutter members 10 and 12 and thence through the apertures in the cutter 10. The slideable mounting of the non-rotatable cutter 10 permits of its adjustment toward and away from the rotatable cutter 12, and when such adjustment is made the feed shaft 13 is moved longitudinally after the adjacent surfaces of the fixed and rotatable cutters engage. The longitudinal movement of the feed shaft tends to cramp the thrust bearing, but the arrangement is such that the forward race member can remain stationary and the rear race member 17 revolve with the feed shaft so as to always permit the easy rotation of the feed shaft.

To remove the feed shaft and associated parts for cleansing, it is only necessary to unthread the adjusting member 8, whereupon the cutter members, feed shaft and bearing members can be removed as a unit. The cutter and bearing members can then be readily slipped off the feed shaft and suitably soaked or brushed in any approved manner.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having described my invention I claim—

1. In a food grinder, a casing having a barrel open at its rear end and an inlet throat opening into the barrel intermediate its ends, a feed shaft mounted in the barrel and having a worm member extending from the inlet throat to the open extremity of the barrel and a widened portion extending forwardly from the inlet throat opening, and a secondary worm feed arranged in the periphery of said widened portion.

2. In a food grinder, a casing having a barrel open at its rear end and an inlet throat opening into the barrel intermediate its ends, a feed shaft mounted in the barrel and having a worm member extending from the inlet throat to the open extremity of the barrel and a widened portion extending forwardly from the inlet throat opening, and a secondary worm feed arranged in the periphery of said widened portion, and a thrust bearing encircling the shaft forwardly of said widened portion and having race members adapted to engage the adjacent end walls of the barrel and the widened portion respectively.

3. A food grinder having a casing open at its rear end, a cutter member slidably mounted in the open end of the casing, a shaft having a worm feed member for advancing the food toward the cutter member, a bearing encircling the end of the shaft spaced from the cutter and provided with race members engaging the adjacent end walls of the casing and worm member respectively, a row of hardened bearings between the race members, and a spring pressed retaining pin arranged to project from the shaft portion forwardly of the race member.

4. In a food grinder, a casing having a barrel open at its rear end and an inlet throat opening into the barrel intermediate its ends, a feed shaft mounted in the barrel and having a worm member extending from the inlet throat to the open extremity of the barrel and a widened portion extending forwardly from the inlet throat opening, a secondary worm feed arranged in the periphery of said widened portion, and a thrust bearing encircling the shaft forwardly of said widened portion and having race members adapted to engage the adjacent end walls of the barrel and the widened portion respectively, and a spring pressed retaining pin arranged to project from the shaft portion forwardly of the race member.

In witness whereof I hereunto set my hand.

WILLIAM W. DRYDEN.